United States Patent Office 3,489,588
Patented Jan. 13, 1970

3,489,588
DECORATING PROCESS
Fred E. Mansur and Louis Spanoudis, Toledo, Ohio, assignors to Owens-Illinois, Inc., Toledo, Ohio, a corporation of Ohio
No Drawing. Filed May 1, 1967, Ser. No. 634,840
Int. Cl. C03c 17/00, 23/00; B44d 1/14
U.S. Cl. 117—38                                9 Claims

ABSTRACT OF THE DISCLOSURE

A process for producing a temperature difference between a decoration and its glass substrate wherein the temperature of said glass is less than the temperature of said decoration, and wherein said process consist of applying an energy reflective coating to the glass, decorating the glass, and curing the decoration with infrared energy.

BACKGROUND OF THE INVENTION

This invention relates to the decorating art, and more particularly the invention pertains to a novel method for producing decorative effects on vitreous and crystallized surfaces. Specifically, the invention is concerned with a method for decorating glass and ceramic articles of commerce by selectively heating the immediate decorable area and reflecting the applied heat in the undecorated remaining surface areas.

Prior to this invention, decorations, marking and like indicia were bonded to glass or ceramic articles of commerce by subjecting the entire article to a heating-up cycle of a firing operation to permanently fuse the desired marking or decoration to the glass or ceramic substrate. Another method, generally employed by the prior art, for firmly adhering decorations, etc., to surfaces merely involved placing the entire article in a hot conventional lehr or furnace to fix the pre-determined pattern onto the vitreous or crystallized article of manufactucre. These prior art practices are often unsuited for decorations or marking certain articles of manufacture, especially those articles that should not be unnecessarily heated over their entire body. For example, excessive exposure to high temperatures, as is often required by past techniques for intimately marking glass enclosures encapsulating electronic components, such as diodes, triodes, transistors and the like, may deteriorate the efficiency, life and usefulness of the electronic component by adversely physically distorting the encapsulated electronic device. Also, the utilization of high temperature, as is often necessary for decorating when applied in an unrestricted manner over the entire surface of the decorable ware, such as scientific glass apparatus, may cause an undesirable distortion, warping or sagging, especially in ware made from glass compositions with a low softening point temperature. These and other fabrication problems intimately associated with the marking and decorating art are very serious as it may be necessary to remanufacture the article of commerce or science only with the accompanying economic loss.

It will be appreciated by those skilled in the marking and decorating art that if a novel method that selectively heats the immediate marking and decorating surface and successfully avoids the heating of the entire workpiece is made available to the instant art, thereby substantially eliminating the adverse conditions associated with the prior art, said method would have a definite use and represent a substantial contribution to the art. Likewise, it will be appreciated by those versed in the present art that if a method is provided to produce desirable and acceptable markings on glass and ceramic substrates which method reflects heat in those areas where heat is not desired while simultaneously accepting heat in the decorating area, said method would satisfactorily increase the usefulness of the method for forming designs, patterns, images and markings on articles of science and commerce.

Accordingly, it is an object of the present invention to provide a novel method for marking and decorating glass and ceramic surfaces.

Another object of this invention is to provide a method for selectively heating glass and ceramic substrates for producing images and designs with enamels and the like.

It is still a further object of the instant invention to provide a method for selectively heating an immediate area of a given article and simultaneously reflecting heat in the remaining areas of said article.

Still a further object of the present invention is to provide a method for decorating, etc., wherein said method the surface absorbs infrared energy in a specific surface region and reflects the infrared energy in other surface regions.

Still a further object of the present invention is to provide a method for marking glass surfaces that overcomes the difficulties associated with the prior art.

Other objects, features and advantages of the instant invention will become evident from the following detailed description of the mode and manner of the disclosed and claimed invention.

SUMMARY OF THE INVENTION

In attaining the above and other contributions of the instant invention, there is provided a novel method for decorating or marking glass, glass-ceramic and like surfaces. The novel method, as described herein, comprises the steps of first treating the substrate with a chemical to form a coating that reflects energy, next, applying an energy absorbing enamel or the like in the predetermined pattern to the coated substrate, and then subjecting the coated substrate to an energy source to intimately fuse the enamel pattern to the substrate while reflecting the energy in the adjacent coated areas of the substrate.

The materials suitable for forming reflective coatings as employed by the present invention are generally those materials that are capable of forming a film or oxide coatings on the substrate. The materials suitable for the present purpose include pyrolyzable metallic salt solution pyrolyzing on contact with a hot surface to form a reflective metal oxide coating on said hot surface. The coatings are usually applied by spraying a newly-formed hot glass surface with a solution containing an appropriate metallic salt where, on intimate contact with the hot surface, the solvent is evaporated or eliminated and a residual oxide coating forms on the just treated hot surface. Other techniques can also be used to apply reflective coatings, such as vacuum evaporation of thin metal coatings, electroplating, staining and the like. Methods for coating glass surfaces are generally known to the art and are set forth in expired U.S. Patent No. 2,118,795. Exemplary of reflective coatings are tin oxide, titanium oxide, iron oxide, silicon monoxide, gold film, aluminum film, chromium film and the like.

The enamels used for the purpose of this invention can be easily prepared by modifying conventional enamels, or colors or by adding colors or infrared absorbing substances to enamels and conventional glasses. The modification of conventional glasses is simply carried out by physically mixing a color or modifier sufficiently with said glass to yield an intimate mixture thereof. The conventional glasses suitable for the purpose of the instant invention generally belong to the soda-lime silicate, lithium-alumino-silicate, lead-alkali-silicate, alumino-silicate and boro-silicate family of glasses. Exemplary of colored glasses prepared for recorating and marking are the addition of 6% $Fe_2O_3$ to powderglass for a red-orange color;

the addition of 8% $ZrO_2$ to glass powder for a grayish white color; the addition of 29% of a mixture of 86% Se and 14% CdS for a pink color; and, the addition of 8% of a mixture of 62.5% $Fe_2O_3$ and 37.5% $Al_2O_3$ to a glass for an orange color. Other coloring composition that can be employed for coloring commercially available glasses include the addition of 10% of a mixture to the base glass of 50% $NiCO_3$ and 50% $Fe_2O_3$ which mixture was calcined for 12 hours at 2000° F. in an air purge, for an olive-green glass; a black pigment prepared by calcinating at 2350° F. for one hour a mixture of 31% CoO, 37% $Fe_2O_3$, 12% $MnO_2$, 13% NiO and 7% $Cr_2O_3$ and the like.

Exemplary of commercially available vitreous enamels are, white enamel consisting of, in weight percent, 27.86 silica, 4.19 boric oxide, 1.28 alumina, 12.54 titanium oxide, 48.81 lead oxide, 0.16 calcium and magnesium oxide, 2.89 sodium oxide, 0.19 potassium oxide, 0.73 lithium oxide, and 0.58 arsenic oxide; a green enamel consisting of 27.17 silica, 2.93 boric oxide, 0.84 alumina, 1.19 cobalt oxide, 2.26 zinc oxide, 7.25 cadmium oxide, 51.01 lead oxide, 0.17 calcium and magnesium oxide, 1.08 sodium oxide, 0.22 potassium oxide, 0.10 arsenic oxide, and 5.62 chromium oxide; and, a blue enamel consisting of 30.00 silica, 2.78 boric oxide, 1.65 alumina, 5.95 titanium oxide, 1.75 cobalt oxide, 48.92 cadmium oxide, 0.29 calcium and magnesium oxide, 2.93 sodium oxide, 1.65 potassium oxide, 0.71 lithium oxide and 0.09 antimony oxide. The enamels can be applied to the article by conventional technique, such as in a pattern predetermined by the design of a silk screen, or such other suitable stencil through which the colors can be applied.

The following examples are merely illustrative of the present invention and are not to be construed as limiting the scope and spirit of the present invention in any manner, as these and other variations will be readily apparent to those versed in the subject art.

EXAMPLE I

A predetermined letter pattern was made on a commercially available bottle in the following manner: a newly-formed 20 milliliter bottle, formed of glass composition consisting of 74.6 weight percent $SiO_2$, 11.2 weight percent $B_2O_3$, 4.9 weight percent $Al_2O_3$, 5.7 weight percent $Na_2O$ and 2.8 weight percent BaO and having a working point of 1200° C., a softening point of 810° C. and an annealing point of 575° C., was vapor sprayed while hot with an aqueous-alcoholic solution of stannic chloride. The stannic chloride pyrolyzes on said hot surface and forms a thin tin oxide film on the newly-formed glass surface. Next, an enamel composition was prepared by mixing 82% of a commercially available blue enamel with 18% of a commercially available blue pigment and sufficient printing oil, about one part of oil to two parts of enamel, to form a silk screen paste. The above-described bottle, after cooling to room temperature, was next printed with a pattern of letters using the enamel composition by conventional printing silk screen techniques. The silk screen technique consists in squeezing the enamel through the pattern defining apertures of a silk screen stencil to the surface to be decorated to form on the surface the predetermined pattern of the screen. The subject bottle, with the tin oxide coating and enamel letters, was then fired in a high heat flux radiant furnace at a wave length of 0.75 microns to 2.5 microns for 75 seconds at 16.8 volts, 15.5 amps. or 2.60 kw. The approximate temperature of the glass at the end of the curing of the enamel was about 1200° F., and the temperature of the enamel was about 1775° F. After cooling to room temperature there was no visible evidence of distortion or slumping of the bottle.

EXAMPLE II

An uncoated bottle similarly decorated and fired in the high heat radiant energy furnace according to the procedure set forth in Example 1, became distorted, the bottom was no longer flat and the bottle rocked easily. The horizontal cross-section appeared to be slightly elipsoidal and the overall height was decreased by about 0.020 inches.

EXAMPLE III

Graduations were placed on a serological pipet in the following manner: a 5 ml. commercially available serological boro-silicate glass pipet containing no graduations or decorations was heated in a furnace to 1250° F. for about 3 minutes and sprayed overall while hot with an alcoholic stannic chloride solution. The composition of the spray solution was 180 ml. of stannic chloride, 500 ml. of isopropanol and 50 ml. of distilled water. The solution was sprayed with a conventional air spray gun and the thickness of the resulting tin oxide coating was less than 1200 A. After the tin oxide coated pipet cooled to room temperature, conventional pipet graduations were silk screened onto the pipet. The graduations were made with enamel composition, prepared by physically mixing a mixture consisting of 85 parts glass powder comprising 49.81 weight percent $SiO_2$, 16.50 weight percent $B_2O_3$, 15.00 weight percent $Al_2O_3$, 8.98 weight percent $Na_2O$, 6.42 weight percent MgO and 3.00 weight percent $Li_2O$ with 15 parts blue pigment and 50 parts squeegee oil. The mixing was carried out in a ball mill and was continued until homogenous. The pipet was then fired in an infra-red furnace at a wave length of 13,300 cm.$^{-1}$ to 4000 cm.$^{-1}$ for 55 seconds at 189 volts, 16 amps or 3.03 kilowatts of power. The approximate temperature of the glass at the end of the curing of the enamel was about 1200 F., and the temperature of the enamel was about 1775° F. There was no noticeable warp in the pipet as prepared by this example.

EXAMPLE IV

Graduations were placed on a 5 ml serological pipet according to the method as set forth in Example 3, and all the reaction conditions and reagents were as before described, except that the pipet was not coated with the tin oxide film. After the enamel decoration on the pipet surface had cured, the pipet was subjected to macroscopic examination and this examination evidenced considerable warp of said pipet.

EXAMPLE V

A series of predetermined markings were placed on a borosilicate glass pipet employing the following technique: a 5 ml. serological pipet was first heated to 1250° F. and kept at this temperature for about 3 minutes, and, while still hot its surface was sprayed with a solution of tetraisopropyl titanate. The tetraisopropyl titanate solution consists of one part by volume of titanate and two parts by volume of anhydrous n-butanol and it was prepared by dissolving the titanate ester at room temperature in the solvent. The solution was sprayed, using compressed air, onto the hot exterior surface of the pipet, and upon contact with the heated glass surface it reacts to form a substantially colorless, transparent layer of less than 1 micron thickness of titanium oxide on the glass pipet. After the pipet had cooled to room temperature, markings were stencil screened onto the coated surface. The stencil held in a frame was brought into contacting relationship with the pipet and the marketing medium was forced through the unfilled interstices of the stencil screen by a squeegee onto the underlying glass surface in the desired pattern. The pipet was then retracted from the screen. The enamel employed for marking the pipet graduations consists of 15 parts blue pigment, 85 parts blue enamel and 50 parts of squeegee oil. The enamels and pigment are sold by the Ceramic Color and Chemical Mfg. Co., New Brighton, Pa. Next, the pipet marking was cured by placing the pipet in a infra-red furnace for 55 seconds at 189 volts, 16 amps or 3.03 kilowatts of power, at a wave length of about 1.5 microns. The approximate temperature of the glass at the end of the infra-red curing of the enamel was about 1125° F. and the temperature of the enamel was about 1650° F.

EXAMPLE VI

Commercially available boro-silicate glass pipets, consisting of 80.6 weight percent $SiO_2$, 13.0 weight percent $B_2O_3$, 2.2 weight percent $Al_2O_3$ and 4.1 weight percent $Na_2O$, were first spray coated at 1250° F. with a solution consisting of 180 ml. stannic chloride, 500 ml. of isopropanol and 50 ml. of water to produce a thin tin oxide layer on the exterior surface of the pipets. Next, predetermined markings were silk screened onto the coated pipets by conventional silk screening techniques. The marking composition consists of 8% $Cr_2O_3$ and 92% of a powder glass consisting of 69.59 weight percent $SiO_2$, 0.20 weight percent $Al_2O_3$, 0.10 weight percent $Na_2O$, 2.20 weight percent $K_2O$, 1.50 weight percent $MgO$, 19.11 weight percent $B_2O_3$, 1.0 weight percent $Li_2O$, 0.30 weight percent $Sb_2O_3$ and 6.0 weight percent $ZnO$, and 50 parts of squeegee oil. The marking composition was prepared by intimately mixing the chromium oxide and the glass in a ball mill until a homogenous mixture was obtained. A paste of the resulting intimate mixture was prepared by adding the squeegee oil. The marked pipets were cured in an infrared furnace for 55 seconds at 189 volts, 16 amps, 3.03 kw. The approximate temperature of the glass at the end of the infrared curing of the enamel was about 1125° F. and the temperature of the enamel was about 1650° F.

Visual observation of the marked pipets did not reveal any cracks or distortions.

EXAMPLE VII

Other pipets, similar to those described immediately above were marked with a composition consisting of 80% of a powdered glass having a composition of 49.81 weight percent $SiO_2$, 16.50 weight percent $B_2O_3$, 15.00 weight percent $Al_2O_3$, 8.98 weight percent $CaO$, 6.42 weight percent $MgO$ and 3.00 weight percent $Li_2O$ and 20% blue pigment. The pipets were surface coated, marked and fired according to the procedure set forth in Example 6 and evidenced like results.

The above examples and disclosure are seen to clearly demonstrate the unexpected and unobvious results that can be obtained by the process of the subject invention. The novel process set forth herein for coating, marking and curing patterns, on substrates without apparently materially affecting the physical characteristics of the substrates is viewed as demonstrating a significant contribution to the subject art.

The decorating and marking process of this invention can be used for decorating and marking items of science and industry, for example, beakers, burettes, thermometers, tumblers, milk bottles, ceramic cookware and the like.

We claim:

1. The method of decorating a rigid substrate selected from the group consisting of glass and glass-ceramic with a durable adherent decorative pattern, wherein said method comprising the steps of initially applying an infrared energy reflective coating to extensive surfaces of said substrate, secondarily applying an infrared energy absorbing enamel in a predetermined pattern to said coated substrate, subjecting said enamel to infrared energy for a sufficient period to fuse the same to said substrate in its predetermined pattern, the infrared energy absorption by said enamel resulting in its being heated to a higher temperature than said coated substrate during its fusion thereto.

2. A method according to claim 1 wherein glass is a member selected from the group of glasses consisting of soda-lime silica, lithium-alumina silicate, alumina-silicate, boro-silicate and lead alkali-silicate glasses.

3. A method according to claim 1 wherein said enamel is applied by screen stencil.

4. A method according to claim 1 wherein said reflective coating on said glass surface is a member selected from the group of oxides consisting of tin oxide, titanium oxide, and iron oxide.

5. A method according to claim 4 wherein said enamel absorbs energy while the oxide coating reflects energy to prevent physical distortion of glass surface.

6. A method according to claim 1 wherein said energy reflective coating is applied to said glass surface at a temperature between the annealing point temperature and the softening point temperature of said glass.

7. A method according to claim 6 wherein said reflective coating is applied to the glass surface by spraying the hot glass with a pyrolyzing metallic tin compound to form a tin oxide coating or said glass surface.

8. A method according to claim 6 wherein said reflective coating is applied to the glass surface by spraying the hot glass with a pyrolyzing metallic titanium compound to form an energy reflective titanium oxide coating on the surface of said glass.

9. A method for producing a temperature difference during the fusing of a decoration to a glass substrate, wherein said method consists in the steps of applying an infrared energy reflective coating to a substrate, applying the decoration, fusing said decoration with infrared energy to intimately fuse it to the substrate and where the temperature of the glass substrate is less than the temperature of the decoration during the fusing process.

References Cited

UNITED STATES PATENTS 2,768,909    1956    Haslam.

ALFRED L. LEAVITT, Primary Examiner

M. F. ESPOSITO, Assistant Examiner

U.S. Cl. X.R.

117—33.3, 35, 45, 69, 93.3, 104, 124, 169